Jan. 30, 1940. J. A. EDEN 2,188,773
BOOKBINDING
Filed Aug. 31, 1938
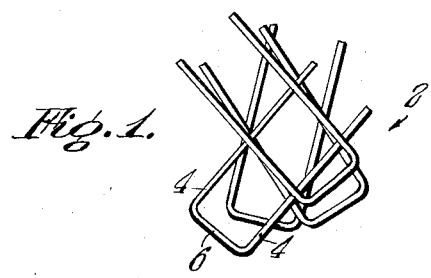
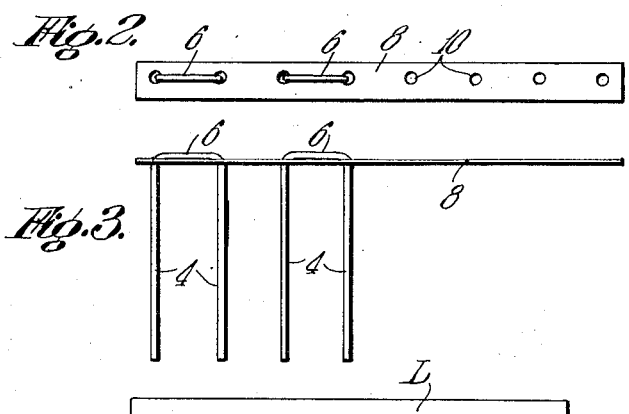
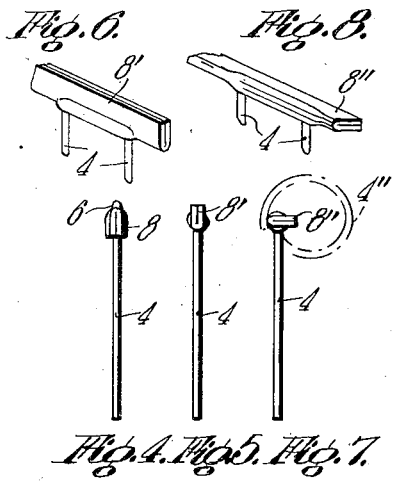
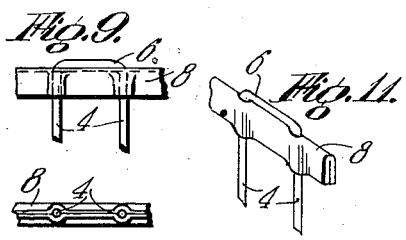
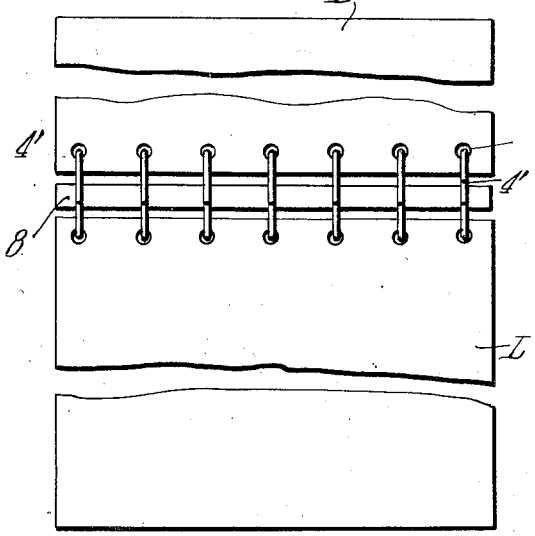
INVENTOR.
James A. Eden.
BY
Walter C. Ross
ATTORNEY.

Patented Jan. 30, 1940

2,188,773

UNITED STATES PATENT OFFICE 2,188,773

BOOKBINDING

James A. Eden, Springfield, Mass., assignor to White & Wyckoff Mfg. Co., Holyoke, Mass., a corporation of Massachusetts Application August 31, 1938, Serial No. 227,809

1 Claim. (Cl. 281—25)

This invention relates to improvements in bookbinding and is directed more particularly to an improved binding for a stack of leaves which is simple and easy to manufacture and which may be readily associated with the leaves.

As special features, the binding device includes a support and a plurality of ring-forming members on which the leaves are free to swing. The support is adapted to serve as a stiffener for the binding and, as will appear, the ring-forming members are easily associated therewith.

Various other objects and advantages of the invention will become more apparent after a reading of the following description, reference being had to the accompanying drawing, wherein:

Fig. 1 is a plan view of a plurality of the ring-forming members of the invention;

Figs. 2 and 3 are plan and side elevational views respectively of the support of the invention with ring-forming members associated therewith;

Fig. 4 is a side elevational view showing one form of the binding of the invention ready for association with the leaves;

Figs. 5 and 6 are side elevational views respectively showing another form of the binding ready for association with the leaves;

Fig. 7 is a side elevational view of still another form with dot-dash lines to explain how the rings are formed;

Fig. 8 is a perspective view of the form shown in Fig. 7;

Fig. 9 is a front elevational view of a section of the binding shown in Fig. 4;

Figs. 10 and 11 are inverted plan and perspective views respectively of the same form as is shown in Figs. 4 and 9; and Fig. 12 is a plan view of an open book which is bound according to the invention.

Referring now to the drawing in detail, the invention will be more fully described.

In Fig. 1 there is shown a plurality of what I call U-shaped clip members 2. These, as will appear, are adapted to form rings and they include side arm portions 4 and transverse connecting parts 6.

Preferably formed of wire, they are easily obtainable and readily bent into the form shown. For reasons of economy in manufacture and simplicity in assembly, they are preferably of equal size.

In Fig. 2 there is shown what I call a support member 8 and this consists of a flat, narrow strip of relatively rigid material, such as metal. Longitudinally of the strip is a plurality of pairs of holes 10.

For purposes which will be described, the holes 10 of each pair are equally spaced. The distance between them is the same as the distance between the arms 4 of the clips and accordingly the latter may extend through the openings as shown in Figs. 2 and 3.

After the clips and support are thus assembled, the bar 8 is bent longitudinally upon itself along a line extending through the holes 10. This may be done in various ways but the net result is that a part, at least, of each clip is embraced.

In Figs. 4, 9, 10 and 11, the supporting strip 8 is shown bent downwardly. That is, the transverse parts 6 of the clips are above the folding line of the bar while the inner end portions of the arms 6 thereof are embraced between the two plies of the strip 8. Preferably the strip 8 is crimped somewhat so that the metal thereof more or less rounds around the arms 4 as clearly indicated in Figs. 9, 10 and 11.

The binding is then ready to be associated with a plurality of leaves L having a series of spaced openings 1 adjacent a marginal edge thereof. The free ends of the arms 4 are inserted in the holes and then bent over into the form of rings 4' as shown in Fig. 12.

The leaves are thus free to swing relative to the support 8 and to one another with the bar 8 serving to stiffen the spaced-ring formation.

In Figs. 5 and 6, there is shown a clip 2 having arms 4 extending through holes in a strip 8'. Here, however, the strip 8' is bent upwardly, rather than downwardly as in the form shown in Fig. 4, so that the transverse portion 6 of the clip is firmly embraced by the plies of metal 8'.

In Figs. 7 and 8, a strip 8" is provided similar to strips 8 and 8' but the arms 4 extend downwardly through holes therein which are provided at one side of the folding line. Thus, the strip may be disposed in the horizontal position shown and the rings 4" shown in dot-dash lines may be formed.

It will be appreciated that the three forms shown are essentially similar and that they may be associated with a stack of leaves in much the same way. The rings, of course, are also all similar.

When forming the rings, the free ends of the U-shaped clips may be brought merely into close adjacency with the strips 8, 8' or 8" or the transverse parts 6 or they may overlap as is indicated by the dot-dash lines shown in Fig. 7.

While I have described the invention in great detail and with respect to the present preferred form thereof, it is not desired to be limited thereto since many changes and modifications may be made therein without departing from the spirit and scope of the invention. What it is desired to claim and secure by Letters Patent of the United States is:

As a new article of manufacture, a binding for a plurality of leaves having a pair of spaced holes therethrough comprising in combination, a U-shaped ring-forming member having arm portions and a transverse connecting portion, and a strip member provided with a pair of spaced holes extending therethrough, said arm portions of the ring-forming member extending downwardly through said holes in the strip member and the latter being folded upwardly along a line running through said holes whereby said transverse portion is embraced by opposite sides of the strip member.

JAMES A. EDEN.